(12) United States Patent
de Borst (10) Patent No.: US 11,171,943 B1
(45) Date of Patent: Nov. 9, 2021

(54) METHODS FOR ADDING OCSP STAPLING IN CONJUNCTION WITH GENERATED CERTIFICATES AND DEVICES THEREOF

(71) Applicant: F5 Networks, Inc., Seattle, WA (US)

(72) Inventor: Jeroen de Borst, Sammamish, WA (US)

(73) Assignee: F5 NETWORKS, INC., Seattle, WA (US)

( * ) Notice: Subject to any disclaimer, the term of this patent is extended or adjusted under 35 U.S.C. 154(b) by 215 days.

(21) Appl. No.: 16/355,011

(22) Filed: Mar. 15, 2019

Related U.S. Application Data (60) Provisional application No. 62/643,444, filed on Mar. 15, 2018.

(51) Int. Cl.
*H04L 29/06* (2006.01)
*H04L 9/32* (2006.01)

(52) U.S. Cl.
CPC ........ *H04L 63/0823* (2013.01); *H04L 9/3247* (2013.01); *H04L 9/3268* (2013.01); *H04L 63/166* (2013.01)

(58) Field of Classification Search
CPC . H04L 63/0823; H04L 9/3268; H04L 9/3247; H04L 63/166
See application file for complete search history.

(56) References Cited

U.S. PATENT DOCUMENTS

| | | | |
|---|---|---|---|
| 7,500,100 B1* | 3/2009 | Kobozev | H04L 9/3263 713/156 |
| 8,392,980 B1* | 3/2013 | Ahrens | H04L 63/166 726/10 |
| 10,454,689 B1* | 10/2019 | Sharifi Mehr | H04L 63/166 |
| 2005/0138351 A1* | 6/2005 | Lee | H04L 63/162 713/151 |
| 2005/0228999 A1* | 10/2005 | Jerdonek | H04L 9/3268 713/176 |
| 2008/0086634 A1* | 4/2008 | Salowey | H04L 9/3268 713/156 |
| 2010/0031031 A1* | 2/2010 | Tian | H04L 63/06 713/156 |
| 2010/0121928 A1* | 5/2010 | Leonard | H04L 63/1433 709/206 |
| 2010/0146260 A1 | 6/2010 | Levow | |

(Continued)

OTHER PUBLICATIONS

Merzdovnik et al.; "Notary-assisted Certificate Pinning for Improved Security of Android Apps", 2016, IEEE, pp. 365-371. (Year: 2016).*

(Continued)

*Primary Examiner* — Matthew Smithers
(74) *Attorney, Agent, or Firm* — Troutman Pepper Hamilton Sanders LLP (Rochester)

(57) ABSTRACT

Methods, non-transitory computer readable media, and network traffic manager apparatus that assists with adding an online certificate status protocol (OCSP) in conjunction with generated certificates includes receiving a client request to access a website via a TLS connection. A server certificate is generated for the requested website. Next, a proof of validity is generated for the generated server certificate. The generated server certificate and the generated proof of validity of the generated server certificate are provided to a client during a TLS handshake period.

20 Claims, 4 Drawing Sheets

(56) References Cited

U.S. PATENT DOCUMENTS

| | | | |
|---|---|---|---|
| 2011/0246646 A1* | 10/2011 | Nakhjiri | H04L 63/0823 709/224 |
| 2013/0061281 A1* | 3/2013 | Pao | G06F 21/44 726/1 |
| 2013/0111362 A1 | 5/2013 | Alexandrov | |
| 2013/0117558 A1* | 5/2013 | Metke | H04L 63/0823 713/156 |
| 2014/0075524 A1* | 3/2014 | Ho | G06F 21/45 726/6 |
| 2014/0095865 A1 | 4/2014 | Yerra | |
| 2014/0165147 A1* | 6/2014 | Hershberg | H04L 63/0823 726/4 |
| 2015/0372824 A1* | 12/2015 | Himawan | H04L 9/006 713/156 |
| 2017/0317837 A1* | 11/2017 | Alrawais | H04L 9/14 |
| 2018/0205559 A1* | 7/2018 | Bu Er | G06F 21/6263 |
| 2019/0245700 A1* | 8/2019 | Dobre | H04L 9/321 |
| 2019/0387264 A1* | 12/2019 | Stephan | H04N 21/237 |

OTHER PUBLICATIONS

Alrawais et al.; "SecureGuard: A Certificate Validation System in Public Key Infrastructure", Jun. 2018, IEEE Transactions on Vehicular Technology, vol. 67, No. 6, pp. 5399-5408. (Year: 2018).*

BIG-IP® Local Traffic Manager™ : Implementations, Version 13.0, F5 Networks, Inc., Mar. 4, 2019.

BIG-IP® Local Traffic Manager™ : Implementations, Version 13.0, F5 Networks, Inc. (2017).

Big-IP® Access Policy Manager®: Implementations, Version 13.0, F5 Networks, Inc. (2017).

* cited by examiner

METHODS FOR ADDING OCSP STAPLING IN CONJUNCTION WITH GENERATED CERTIFICATES AND DEVICES THEREOF

GENERATED CERTIFICATES AND DEVICES THEREOF

This application claims the benefit of U.S. Provisional Patent Application Ser. No. 62/643,444, filed Mar. 15, 2018, which is hereby incorporated by reference in its entirety.

FIELD

This technology generally relates to methods and devices for network traffic management and, more particularly, to methods for adding an online certificate status protocol (OCSP) in conjunction with generated certificates and devices thereof.

BACKGROUND

Online certificate status protocol (OCSP) is a method for delivering a status of a digital certificate to a requesting client. Under OCSP, a web server may present a digital certificate to a browser application and the web browser is required to ensure that the certificate is valid before accepting the certificate. To ensure the validity of the certificate, the browser application requests an OCSP response from a certificate authority (CA) that issued the certificate. When the CA receives the OCSP request, the CA sends a digitally signed OCSP response to the browser application.

Unfortunately, the browser application may experience substantial delays in receiving an OCSP response. For instance, delays may occur within the network of the user's Internet Service Provider (ISP), the ISP of the CA, or in any of the routers or networks of the Internet between the ISPs of the user and the CA. Such delays may occur because the browser application needs to communicate with the CA that serves the OCSP response thereby resulting in substandard user experience.

SUMMARY

A method for adding an online certificate status protocol (OCSP) in conjunction with generated certificates includes receiving a client request to access a website via a TLS connection. A server certificate is generated for the requested website. Next, a proof of validity is generated for the generated server certificate. The generated server certificate and the generated proof of validity of the generated server certificate are provided to a client during a TLS handshake period.

A non-transitory computer readable medium having stored thereon instructions for enforcing firewall and security policies based on subscriber identification comprising machine executable code which when executed by at least one processor, causes the processor to receive a client request to access a website via a TLS connection. A server certificate is generated for the requested website. Next, a proof of validity is generated for the generated server certificate. The generated server certificate and the generated proof of validity of the generated server certificate are provided to a client during a TLS handshake period.

A network traffic management apparatus including at least one of configurable hardware logic configured to be capable of implementing or a processor coupled to a memory and configured to execute programmed instructions stored in the memory to receive a client request to access a website via a TLS connection. A server certificate is generated for the requested website. Next, a proof of validity is generated for the generated server certificate. The generated server certificate and the generated proof of validity of the generated server certificate are provided to a client during a TLS handshake period.

A network traffic management system, comprising one or more traffic management apparatuses, client devices, or server devices, the network traffic management system comprising memory comprising programmed instructions stored thereon and one or more processors configured to be capable of executing the stored programmed instructions to receive a client request to access a website via a TLS connection. A server certificate is generated for the requested website. Next, a proof of validity is generated for the generated server certificate. The generated server certificate and the generated proof of validity of the generated server certificate are provided to a client during a TLS handshake period.

This technology provides a number of advantages including providing a method, non-transitory computer readable medium, apparatus, and system that assist with adding an online certificate status protocol (OCSP) in conjunction with generated certificates. By sending the proof of validity of the certificate, the browser is no longer required to verify the certificate with the certificate authority (CA) as a separate network transaction, thus improving the protocol efficiency.

DETAILED DESCRIPTION

Figure 1:
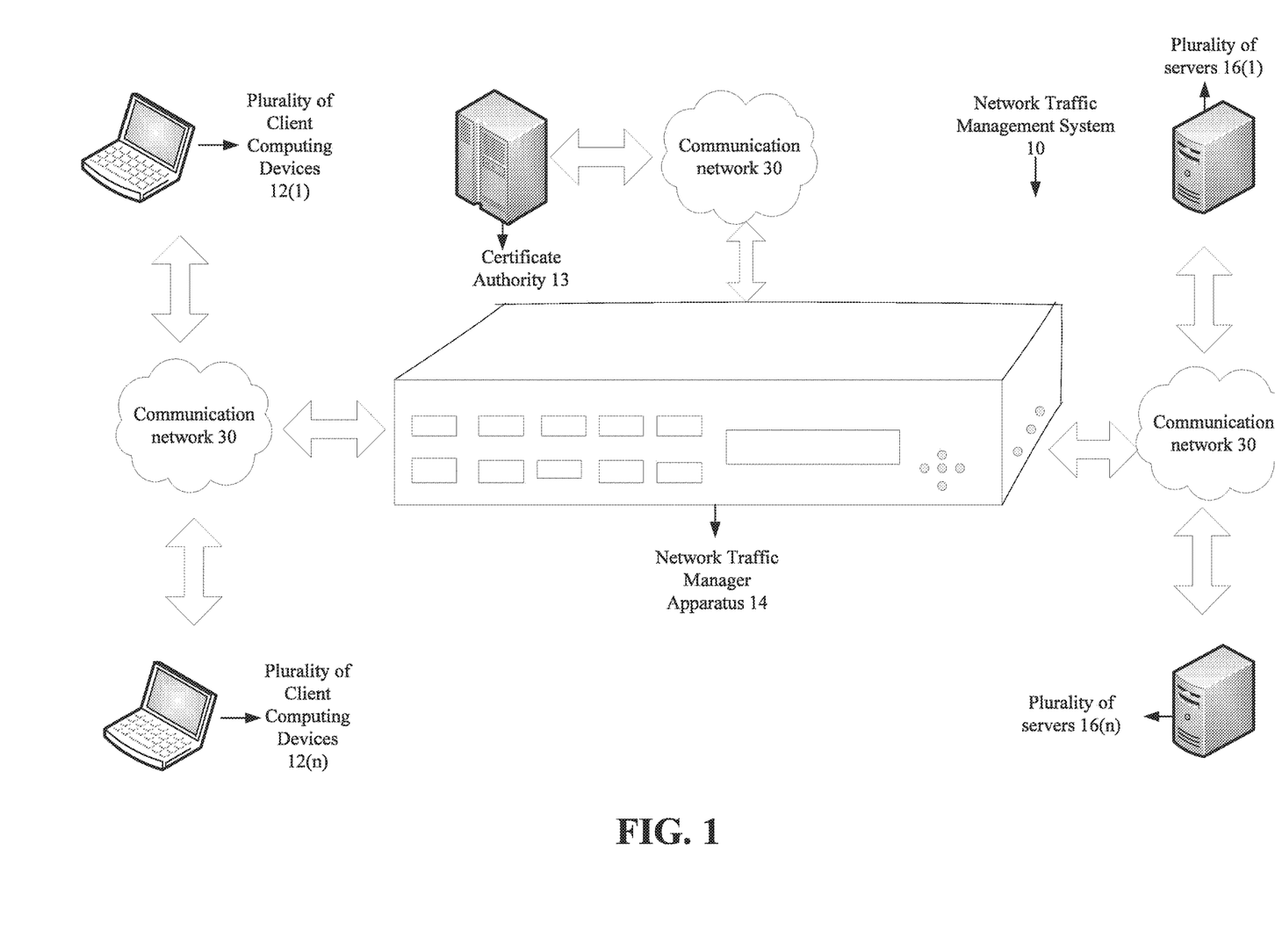
FIG. 1 is an example of a block diagram of a network traffic management system including a network traffic management apparatus for adding an online certificate status protocol (OCSP) in conjunction with generated certificates.
Figure 2:
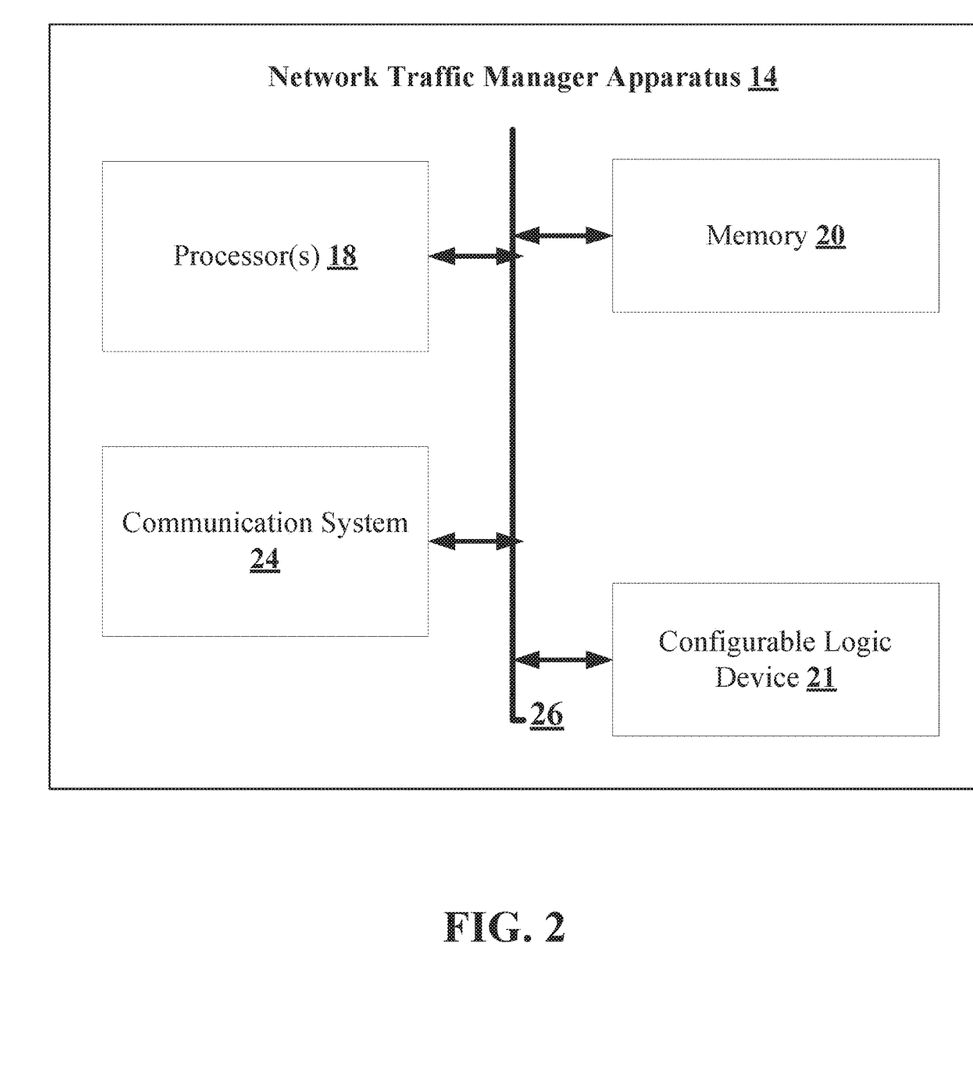
FIG. 2 is an example of a block diagram of a network traffic management apparatus.

An example of a network environment 10 which incorporates a network traffic management system for adding an online certificate status protocol (OCSP) in conjunction with generated certificates with the network traffic manager apparatus 14 is illustrated in FIGS. 1 and 2. The exemplary environment 10 includes a plurality of client computing devices 12(1)-12(n), a certificate authority 13, a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including adding an online certificate status protocol (OCSP) in conjunction with generated certificates.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. As illustrated in FIG. 1, the network traffic manager apparatus 14 is coupled to the certificate authority 13 through the communication network 30, although the network traffic manager apparatus 14 can be coupled to the certificate authority 13 via other topologies. Additionally, the network traffic manager apparatus 14 is coupled to the plurality of servers 16(1)-16(n) through the communication network 30, although the plurality of servers 16(1)-16(n) and the network traffic manager apparatus 14 may be coupled together via other topologies. Furthermore, the plurality of servers 16(1)-16(n) is coupled to the certificate authority 13 via communication network 30, although the plurality of servers 16(1)-16(n) can be coupled to the certificate authority 13 via other topologies.

The network traffic manager apparatus 14 assists with adding an online certificate status protocol (OCSP) in conjunction with generated certificates as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
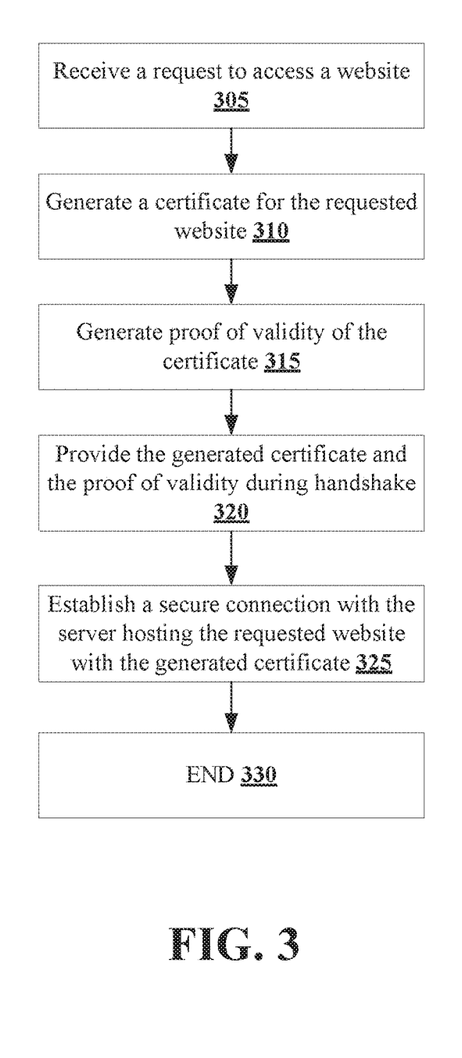
FIG. 3 is an exemplary flowchart of a method for adding an online certificate status protocol (OCSP) in conjunction with generated certificates.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 4:
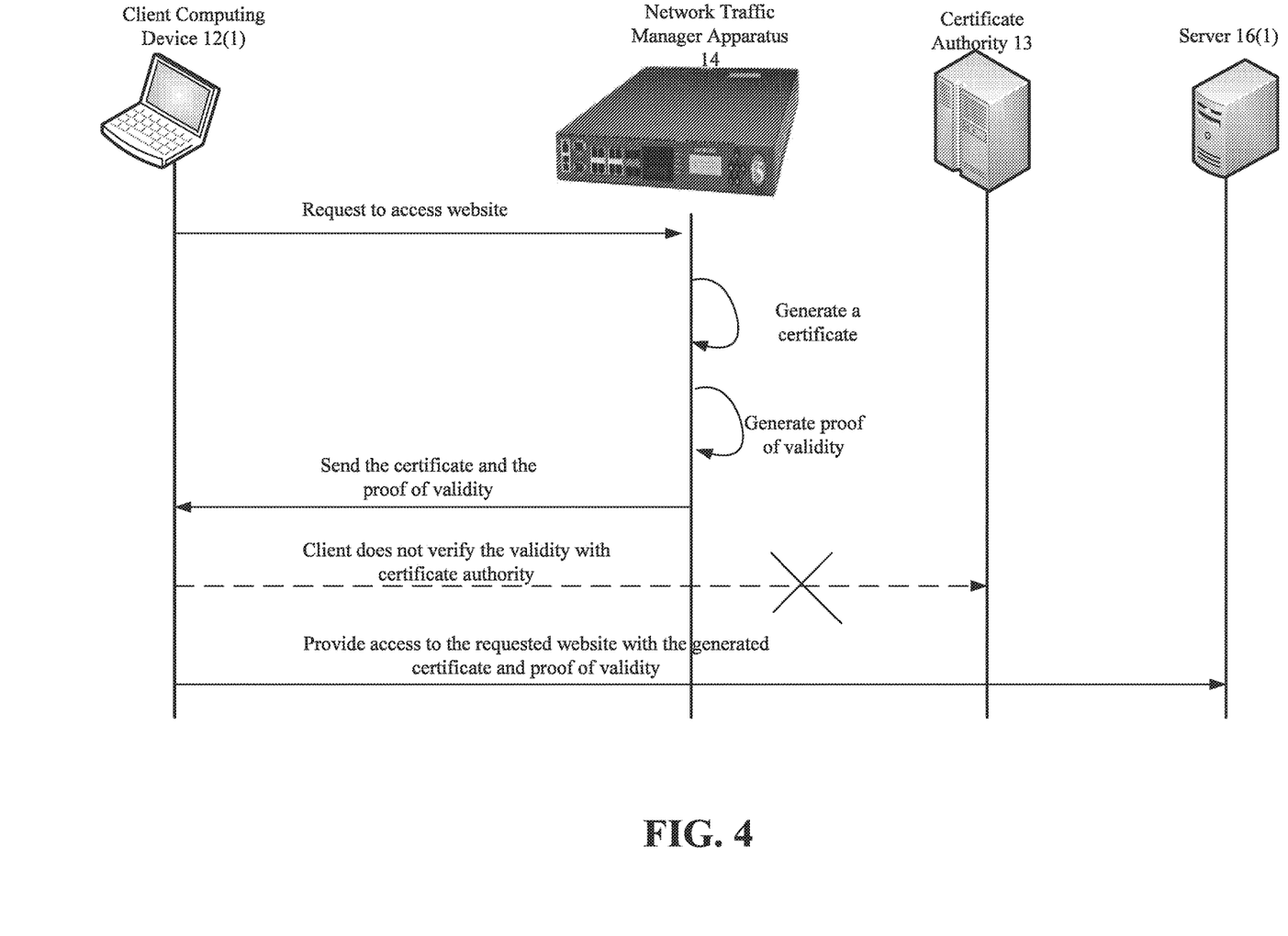
FIG. 4 is an exemplary sequence diagram for adding an online certificate status protocol (OCSP) in conjunction with generated certificates.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the certificate authority 13, the plurality of client computing devices 12(1)-12(n) and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

The certificate authority 13 in this example can include a central processing unit (CPU) or processor, a memory, input/display device interface, configurable logic device and an input/output system or I/O system, which are coupled together by a bus or other link. The certificate authority 13, in this example, may run interface applications that may provide an interface to send and/or receive data to and/or from the network traffic manager apparatus 14 or the plurality of servers 16(1)-16(n). In this example, the certificate authority 13 is an entity that issues digital certificates, although the certificate authority can perform other types or amounts of functions. Additionally, the certificate authority 13 can include any type of computing device that can receive, render, and facilitate user interaction, such as client computers, network computer, mobile computers, mobile phones, virtual machines (including cloud-based computer), or the like.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), the Certificate authority 13, network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of data requested by the plurality of client computing devices 12(1)-12(n), the Certificate authority 13, or the network traffic manager apparatus 14. The plurality of servers 16(1)-16(n) may provide data or receive data in response to requests directed toward the respective applications on the plurality web application servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, one or more actions of the plurality of servers 16(1)-16(n) may be distributed across one or more distinct network computing devices. Moreover, the plurality of servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the certificate authority 13, the network traffic manager apparatus 14, and the plurality of servers 16(1)-16 (n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the certificate authority 13, the plurality of servers 16(1)-16(n), for example, may be configured to operate as virtual instances on the same physical machine. In other words, one or more of network traffic manager apparatus 14, the plurality of client computing devices 12(1)-12 (n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, the certificate authority 13 or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for adding an online certificate status protocol (OCSP) in conjunction with generated certificates will now be described with reference to FIGS. 1-4. First in step 305, the network traffic manager apparatus 14 receives a request to access a website from one of the plurality of client computing devices 12(1)-12(n), although the network traffic manager apparatus 14 can receive other types or amounts of requests. In this example, the received request can be through a hello message sent via a transport layer security connection, although the network traffic manager apparatus 14 can make the request through other connections and/or in other manners.

Next in step 310, the network traffic manager apparatus 14 generates a certificate for the requested website. In this example, the network traffic manager apparatus 14 generates a certificate similar to the certificate issued by the certificate authority 13 for the same website. Upon generating the certificate, the network traffic manager apparatus 14 signs the generated certificate. By way of another example, the network traffic manager apparatus 14 may also obtain the certificate for the requested website from the certificate authority 13.

In step 315, the network traffic manager apparatus 14 generates a proof of validity of the generated certificate. In this example, the network traffic manager apparatus 14 also signs the generated proof of validity of the generated certificate and the signature would be similar to that of the certificate authority 13.

In step 320, the network traffic manager apparatus 14 provides the generated certificate along with the proof of the validity of the certificate during the TLS handshake messages. Additionally in this example, the network traffic manager apparatus 14 sends the generated proof of validity for all the communication exchanged between the requesting one of the plurality of client computing devices 12(1)-12(n) and the network traffic manager apparatus 14. By generating and sending the proof of validity of the generated certificate, this example of the technology avoids requiring the requesting one of the plurality of client computing devices 12(1)-12(n) from verifying the validity of the generated certificate with the certificate authority 13, thus implying a high level of trust with the network traffic manager apparatus 14. Additionally, the protocol efficiency is also increased as the requesting one of the plurality of client computing devices 12(1)-12(n) is not longer required to attempt to verify the certificate with the certificate authority 13.

In step 325, the network traffic manager apparatus 14 establishes a secure connection between the requesting one of the plurality of client computing devices 12(1)-12(n) and one of the plurality of servers 16(1)-16(n) hosting the requested website using the generated certificate and the proof of validity and the exemplary method ends at step 330.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for adding an online certificate status protocol (OCSP) in conjunction with generated certificates, the method implemented by a network traffic management system comprising one or more network traffic apparatuses, client devices, or server devices, the method comprising:
receiving a request from a client to access a website via a TLS connection;
generating a server certificate for the requested website;
generating a proof of validity for the generated server certificate, wherein the generated proof of validity is signed without communicating with a certificate authority; and
providing the generated server certificate and the signed proof of validity of the generated server certificate to a client during a TLS handshake period.

2. The method as set forth in claim 1 wherein the generated server certificate is similar to an original server certificate issued by the certificate authority.

3. The method as set forth in claim 1, wherein the signature is comparable to an original signature of a certificate authority.

4. The method as set forth in claim 1 further comprising, establishing a secure connection with a server hosting the requested website using the generated server certificate and the generated proof of validity.

5. The method as set forth in claim 1 wherein the generated server certificate with a certificate authority is verified without the client and based on the generated proof of validity.

6. A non-transitory computer readable medium having stored thereon instructions for adding an online certificate status protocol (OCSP) in conjunction with generated certificates comprising executable code which when executed by one or more processors, causes the processors to:
receive a request from a client to access a website via a TLS connection;

generate a server certificate for the requested website;

generate a proof of validity for the generated server certificate, wherein the generated proof of validity is signed without communicating with a certificate authority; and provide the generated server certificate and the signed proof of validity of the generated server certificate to a client during a TLS handshake period.

7. The medium as set forth in claim 6 wherein the generated server certificate is similar to an original server certificate issued by the certificate authority.

8. The medium as set forth in claim 6, wherein the signature is comparable to an original signature of a certificate authority.

9. The medium as set forth in claim 6 further comprising, establish a secure connection with a server hosting the requested website using the generated server certificate and the generated proof of validity.

10. The medium as set forth in claim 6 wherein the generated server certificate with a certificate authority is verified without the client and based on the generated proof of validity.

11. A network traffic manager apparatus, comprising memory comprising programmed instructions stored in the memory and one or more processors configured to be capable of executing the programmed instructions stored in the memory to:

receive a request from a client to access a website via a TLS connection;

generate a server certificate for the requested website;

generate a proof of validity for the generated server certificate, wherein the generated proof of validity is signed without communicating with a certificate authority; and provide the generated server certificate and the signed proof of validity of the generated server certificate to a client during a TLS handshake period.

12. The apparatus as set forth in claim 11 wherein the generated server certificate is comparable to an original server certificate issued by the certificate authority.

13. The apparatus as set forth in claim 11, wherein the signature is similar to an original signature of a certificate authority.

14. The apparatus as set forth in claim 11 wherein the one or more processors are further configured to be capable of executing the programmed instructions stored in the memory to establish a secure connection with a server hosting the requested website using the generated server certificate and the generated proof of validity.

15. The apparatus as set forth in claim 11 wherein the generated server certificate with a certificate authority is verified without the client and based on the generated proof of validity.

16. A network traffic management system, comprising one or more traffic management apparatuses, client devices, or server devices, the network traffic management system comprising memory comprising programmed instructions stored thereon and one or more processors configured to be capable of executing the stored programmed instructions to:

receive a request from a client to access a website via a TLS connection;

generate a server certificate for the requested website;

generate a proof of validity for the generated server certificate, wherein the generated proof of validity is signed without communicating with a certificate authority; and provide the generated server certificate and the signed proof of validity of the generated server certificate to a client during a TLS handshake period.

17. The network traffic management system of claim 16 wherein the generated server certificate is similar to an original server certificate issued by the certificate authority.

18. The network traffic management system of claim 16, wherein the signature is comparable to an original signature of a certificate authority.

19. The network traffic management system of claim 16 wherein the one or more processors are further configured to be capable of executing the programmed instructions stored in the memory to establish a secure connection with a server hosting the requested website using the generated server certificate and the generated proof of validity.

20. The network traffic management system of claim 16, wherein the generated server certificate with a certificate authority is verified without the client and based on the generated proof of validity.

\* \* \* \* \*